April 11, 1961
K. CLARK
2,978,866
ADJUSTABLE NOZZLE FOR ROCKET
Filed Sept. 30, 1957
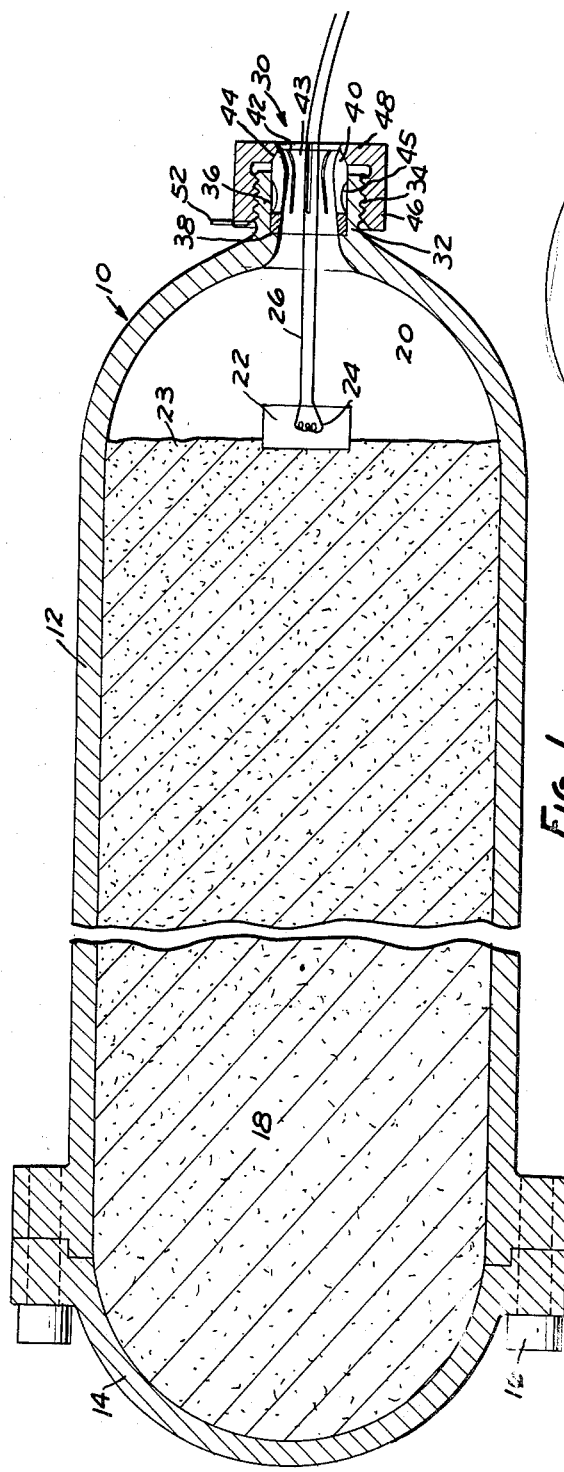
INVENTOR.
KENDALL CLARK
BY
Clifford L. Sadler
ATTORNEY

United States Patent Office 2,978,866
Patented Apr. 11, 1961

2,978,866

ADJUSTABLE NOZZLE FOR ROCKET

Kendall Clark, Bloomfield Hills, Mich., assignor to Curtiss-Wright Corporation, a corporation of Delaware Filed Sept. 30, 1957, Ser. No. 687,147

2 Claims. (Cl. 60—35.6)

The present application relates to rocket motors and more particularly to an adjustable nozzle for such motors.

In rocket motors for vehicles, such as guided missiles, it is desirable to have an equal propulsion thrust under all operating conditions. However, it has been found that the amount of thrust from a solid propellent motor is effected in part by the ambient temperature at which the device is operated.

Solid propellent rocket motors operated at ambient temperatures above the designed level will burn at an increased internal pressure. This higher pressure results in higher thrust, undesirably above the designed level. Conversely, rockets of this type which are operated at low ambient temperatures have a low internal pressure and temperature resulting in a lesser thrust from the motor.

Previous to the present invention rocket motors having exothermic fuels were provided with a series of replaceable nozzles each having a different diameter. A nozzle with a relatively large hole is used at high temperatures to keep the internal pressure down and maintain the thrust at the desired level. Conversely, a nozzle having a smaller opening is used at low temperatures so that there will be an increase in internal pressure when the rocket fuel is burned, which in turn increases the thrust of the rocket motor to the proper level.

In view of the foregoing state of the art, it is an object of the present invention to provide adjustment means for a rocket motor to control its thrust level.

It is another object to provide a single nozzle for a rocket motor which may be adjusted to varying the discharge opening size.

It is a further object of this invention to provide a rocket motor having nozzle adjustment means directly calibrated to ambient temperature.

These and further objects of the present application will become apparent from the following description and the accompanying drawings in which:

Figure 1 is a sectional view of a rocket motor having an adjustable nozzle in accordance with the present invention, Figure 2 is an end view of the nozzle disclosed in Figure 1, Figure 3 is a sectional view of a modified form of the nozzle disclosed in Figure 1, Figure 4 is an elevational view of the nozzle of Figure 3, and Figure 5 is a sectional view of a modified form of the adjustable nozzle member.

Referring to the drawings wherein like reference numerals refer to similar parts, a rocket motor is indicated generally by the numeral 10. Motor 10 is substantially bottle-shaped having an outer case 12 and a bottom closure 14 secured thereto by means such as bolts 16. Bottom 14 provides a means for obtaining access to the interior of the motor 10 and filling it with a propellent charge. For purposes of illustration the rocket motor is disclosed as having an exothermic solid fuel propellent charge 18. The charge 18 nearly fills the case 12 except for a relatively small void portion 20 adjacent its output end. Located in the void 20, an ignition cap 22 is embedded in the exposed face 23 of the charge 18 which functions as a primer to ignite the charge 18. Cap 22 has an electric filament 24 buried inside of it that in turn is connected to electric wires 26. The application of an electrical potential through wires 26 across the filament 24 will ignite the primer cap 22 which in turn causes the rocket charge 18 to burn. Because the fuel is exothermic it will continue to burn once it is ignited.

The rear or top of the bottle-shaped motor 10 has a restricted opening indicated generally at 30 which forms a nozzle for exhausting gaseous products created during the combustion of the propellent charge 18. Nozzle 30 is provided with means whereby the size of the opening can be adjusted to control the internal temperature and pressure of motor 10.

Referring to Figure 1, the top of the bottle-shaped casing 12 has a neck 32 with threads 34 formed on the exterior thereof. The interior of the neck 32 is bored out at 36 to a depth so as to provide a shoulder 38. Received within the bore 36 is nozzle member 40 abutting against the shoulder 38. Member 40 has a substantially cylindrical exterior with a converging-diverging interior wall which forms a venturi or nozzle passageway. The exterior end of member 40 is bevelled to form a truncated conical surface 44.

Member 40 has a series of circumferentially arranged, radial slots 42 which extend axially rearwardly from a plane spaced apart from that end of member 40 which butts against the shoulder 38. The slots 42 are spaced so as to form a series of fingers 43 in nozzle member 40. In order to make the fingers 43 flexible, a continuous groove 45 is relieved about the exterior surface of the nozzle 40.

Threadably engaging the neck 32 is a nut 46 which has an inwardly directed radial flange 48 at its outer end. Flange 48 has one edge thereof bevelled so as to complement the bevelled surface 44 of member 40.

By turning the nut 46 on the threads 34 so that it will move in a direction towards the bottle, flange 48 will bear against surface 44 of nozzle member 40 causing a wedging or camming action. Inasmuch as member 40 is restrained by shoulder 38, the camming action will cause the fingers 43 to flex inwardly resulting in a reduction in the interior diameter of the nozzle member 40.

The aforedescribed arrangement provides a means for varying the interior nozzle area by merely turning a nut which reduces the diameter of its opening. In order to facilitate the nozzle adjustment, a pointer 52 is provided on the nut 46. Temperature indicia are located on the end surface of casing 12. The range of the temperature indicia is determined by the locale in which the rocket motor will be used. By way of example, Figure 2 illustrates a provision for adjustments ranging from ambient temperatures of 110° to —60°. The exact location of these temperature markings in relation to the position of the pointer 52 is determined by experimental calibration of the nozzle device. The temperature indicia and pointer allow the nozzle to be adjusted directly in relation to the ambient temperature.

Figures 3 and 4 illustrate a modification of the nozzle adjustment means of Figure 1. A nozzle member 140 is provided having an internal shape quite similar to the previously described member 40. In Figure 3 casing 12 has a neck portion 32 with exterior threads 34 thereon. The interior of the neck 34 is bored out at 36 to a depth at which point the hole is bevelled to provide a truncated conical surface 152. Nozzle member 140 is provided with a series of longitudinal fingers 143 formed in the end thereof. The ends of the fingers 143 are also bevelled to provide a substantially truncated conical surface 144. In the assembled position, surfaces 144 and 152 complement each other.

Nozzle member 140 is further characterized by an annular groove 145 formed about the finger portion thereof. The outer diameter of member 140 is reduced so as to provide a shoulder 154 about the exterior surface thereof, spaced apart from the nozzle's exhaust end.

A nut 146 threadably engages the exterior of the surface of the neck 36 and has an inwardly directed radial flange 148 on its outer end which bears against shoulder 154 formed in nozzle member 140. By rotating nut 146 in the proper direction as determined by the pitch of threads 34, flange 148 will bear against shoulder 154 causing the nozzle member 140 to be forced inwardly wedging its end surface 144 against the inclined surface 152 of the neck 32. This wedging action will cause the fingers 143 to converge, thus decreasing the restriction of the nozzle member 140.

By experimental use the desired nozzle diameter can be determined relative to a particular thrust and a given ambient temperature. It is apparent that the nozzle diameter is dependent upon the relative angular relationship of the nut 146 and the casing 112. When the exact relationship for a given ambient temperature is determined, indicia corresponding to various operating temperatures can be provided on the exterior of the nut 146. One end of the exterior side of the nut 146 is knurled as at 156 so that the member can be turned by hand.

In order to calibrate, the nozzle member 140 and nut 146 are assembled to the neck 32 of casing 12. The nut 146 is then tightened and its interior diameter measured until it is of such a size as is appropriate for a given temperature. This could be accomplished for example, by employing a rod-like tool having an outside diameter corresponding to the interior diameter of nozzle member 140 preset for an ambient temperature of 40°. This tool would be inserted within the nozzle and the nut 146 tightened until finger 143 assumed an inside diameter corresponding to the rod. When this has been done the base of the neck 32 of the casing 12 is punched with an index mark such as 158 opposite the calibrated temperature which in this example is 40°. Once the nozzle has been calibrated and the index mark set for a particular temperature, the correlation will be correct for all temperatures.

Figure 5 illustrates a still further modification of the internal nozzle member. In that view, a nozzle member 240 is composed of a plurality of independent sections 242, which are fitted side by side so as to form the complete tube-like nozzle. Each individual section 242 is offset, as at 243, so that the juxtaposed sides of adjacent nozzle sections 242 complement and nest together. The assembled sections 242 making up the nozzle member 240 are retained by a continuous spring 246 which holds the sections 242 slightly separated from one another. The nozzle member 240 is also characterized by bevelled cam faces 244 formed on the end of each section 242.

The nozzle member 240 just described may be substituted for nozzle member 140 of Figure 3 to achieve the desired adjustability. When located within the bore 36 of casing 12, cam face 244 mates with face 152. If the nut 146 is threaded at 36 against the nozzle member 240, cam action will force the sections 242 to converge radially thus restricting the inside area of the nozzle in a fashion somewhat similar to the arrangements of Figures 1 and 3. The sections 242 are offset at 243 to prohibit the escape of gas through the slight space between the sections 242 and also to permit the interlock thereof.

While the present description sets forth this invention with particular exactitude, this has been done for illustrative purposes only. Changes and modifications will obviously occur to those skilled in the art which will come within the scope and spirit of the present invention as defined in the following claims.

I claim:

1. In a rocket motor having a body member containing a propellent charge producing hot exhaust gases, adjustable nozzle means adapted to said body member, said means comprising an internal nozzle member having a venturi-shaped interior portion and an annularly undercut exterior portion adjacent thereto, a plurality of longitudinal flexible fingers formed in said nozzle member, a nut member threadably engaging said body, complementary cam surfaces between said nut member and said nozzle member, ambient temperature indicia and an index mark associated with said nut member and said body so as to indicate the relative angular position therebetween.

2. Nozzle means for use with hot gas exhausting rocket motors, and comprising; a nozzle member of heat resistant material receivable within the outlet of a rocket motor case, said nozzle member including a venturi-shaped throat and having an annular groove provided externally thereof, longitudinal slots formed in said nozzle member from one end thereof and across said throat and groove to provide a plurality of radially contractable throat forming fingers, and relatively adjustable shoulder means provided on said rocket motor case for retentative engagement with opposite ends of said nozzle member, one of said shoulder means and the ends of said fingers including cooperating cam surfaces for the controlled wedging radial contraction of said throat forming fingers.

References Cited in the file of this patent

UNITED STATES PATENTS

| | | |
|---|---|---|
| 186,310 | Curtis | Jan. 16, 1877 |
| 1,657,663 | Devereux | Jan. 31, 1928 |
| 2,481,059 | Africano | Sept. 6, 1949 |
| 2,518,625 | Langstaff | Aug. 15, 1950 |
| 2,569,996 | Kollsman | Oct. 2, 1951 |
| 2,583,570 | Hickman | Jan. 29, 1952 |
| 2,612,747 | Skinner | Oct. 7, 1952 |
| 2,793,080 | Brown | May 21, 1957 |
| 2,894,692 | Ledbetter et al. | July 14, 1959 |

FOREIGN PATENTS

| | | |
|---|---|---|
| 11,067 | Netherlands | May 15, 1924 |